United States Patent [19]

LaMaire et al.

[11] Patent Number: 5,299,190

[45] Date of Patent: Mar. 29, 1994

[54] TWO-DIMENSIONAL ROUND-ROBIN SCHEDULING MECHANISM FOR SWITCHES WITH MULTIPLE INPUT QUEUES

[75] Inventors: Richard O. LaMaire, Yorktown Heights; Dimitrios N. Serpanos, Ossining, both of N.Y.

[73] Assignee: International Business Machines Corporation, Armonk, N.Y.

[21] Appl. No.: 993,211

[22] Filed: Dec. 18, 1992

[51] Int. Cl.$^5$ ............................................. H04Q 11/04
[52] U.S. Cl. .................... 370/58.2; 370/58.1; 370/95.3
[58] Field of Search .................. 370/94.1, 95.3, 58.1, 370/58.2, 58.3, 60, 60.1, 61, 95.1, 85.7; 340/825.06–825.08, 825.03

[56] References Cited

U.S. PATENT DOCUMENTS

| | | | |
|---|---|---|---|
| 4,817,084 | 3/1989 | Arthurs et al. | 370/60 |
| 5,040,176 | 8/1991 | Barzilai et al. | 370/94.1 |
| 5,107,489 | 4/1992 | Brown et al. | 370/58.2 |
| 5,132,965 | 7/1992 | Zhang | 370/60 |
| 5,163,049 | 11/1992 | Smith et al. | 370/94.1 |
| 5,216,668 | 6/1993 | Zhang | 370/60 |

Primary Examiner—Douglas W. Olms
Assistant Examiner—Chau T. Nguyen
Attorney, Agent, or Firm—Whitham & Marhoefer

[57] ABSTRACT

A method of scheduling requests from $N^2$ input queues to N outputs is applied to an $N \times N$ switch with each of the N input ports having N input queues, each of the N input queues for each of the N input ports corresponding to one of the N output ports. The method uses a request matrix with each row representing an input and each column representing an output. A bit in a given row and column of the matrix thus represents a request from a corresponding input port for connection to a corresponding output port. Diagonal service patterns are used to overlay the request matrix to determine which requests are to be serviced. A sequence of diagonal service patterns for each of K time slots is used in such a manner that a fairer and yet still computationally simple scheduler provides guaranteed service within the $2N-1$ time slots.

11 Claims, 8 Drawing Sheets

|   | Time Slot Index | | | |
|---|---|---|---|---|
| | 0 | 1 | 2 | 3 |
| 0 | 0 | 1 | 2 | 3 |
| 1 | 1 | 3 | 0 | 2 |
| 2 | 2 | 0 | 3 | 1 |
| 3 | 3 | 2 | 1 | 0 |

Pattern Sequence →

Pattern Sequence Matrix

FIGURE 3B

|   | Outputs | | | |
|---|---|---|---|---|
| | 0 | 1 | 2 | 3 |
| 0 | 0 | 1 | 2 | 3 |
| 1 | 3 | 0 | 1 | 2 |
| 2 | 2 | 3 | 0 | 1 |
| 3 | 1 | 2 | 3 | 0 |

Inputs

Diagonal Pattern Matrix

Time Slot 0 to 3

Diagonal Pattern Matrix

|   | Outputs | | | |
|---|---|---|---|---|
| Inputs | 0 | 1 | 2 | 3 |
| 0 | 0 | 1 | 2 | 3 |
| 1 | 3 | 0 | 1 | 2 |
| 2 | 2 | 3 | 0 | 1 |
| 3 | 1 | 2 | 3 | 0 |

Pattern Sequence Matrix

|   | Time Slot Index | | | |
|---|---|---|---|---|
| Pattern Sequence | 0 | 1 | 2 | 3 |
| 0 | 0 | 1 | 2 | 3 |
| 1 | 1 | 3 | 0 | 2 |
| 2 | 2 | 0 | 3 | 1 |
| 3 | 3 | 2 | 1 | 0 |

Time Slot 4 to 7

Diagonal Pattern Matrix

|   | Outputs | | | |
|---|---|---|---|---|
| Inputs | 0 | 1 | 2 | 3 |
| 0 | 3 | 0 | 1 | 2 |
| 1 | 1 | 2 | 3 | 0 |
| 2 | 0 | 1 | 2 | 3 |
| 3 | 2 | 3 | 0 | 1 |

Time Slot 8 to 11

Diagonal Pattern Matrix

|   | Outputs | | | |
|---|---|---|---|---|
| Inputs | 0 | 1 | 2 | 3 |
| 0 | 2 | 3 | 0 | 1 |
| 1 | 0 | 1 | 2 | 3 |
| 2 | 1 | 2 | 3 | 0 |
| 3 | 3 | 0 | 1 | 2 |

Time Slot 12 to 15

Diagonal Pattern Matrix

|   | Outputs | | | |
|---|---|---|---|---|
| Inputs | 0 | 1 | 2 | 3 |
| 0 | 1 | 2 | 3 | 0 |
| 1 | 2 | 3 | 0 | 1 |
| 2 | 3 | 0 | 1 | 2 |
| 3 | 0 | 1 | 2 | 3 |

FIGURE 4

TWO-DIMENSIONAL ROUND-ROBIN SCHEDULING MECHANISM FOR SWITCHES WITH MULTIPLE INPUT QUEUES

BACKGROUND OF THE INVENTION

1. Field of the Invention

The present invention generally relates to switching systems for multiplex communications systems and, more particularly, to a switching scheduler which schedules the transmission times of fixed-length packets in a time-slotted switch that has N input ports and N output ports and wherein each of the N input ports has N queues, one queue corresponding to each output port.

2. Description of the Prior Art

There are many applications in the communications and data processing fields that require the scheduling of a system (usually a switch) that has N input resources and N output resources. This gives rise to a scheduling problem in which the resource requests can be represented by an N×N matrix. During a time slot, only one request can be granted in any row or column of this request matrix. The scheduler determines which requests are satisfied during successive time slots. The objective of the scheduler is to provide high throughput, i.e., try to maximize the number of requests that are granted, while also providing fair service to the different requests. Further, in order to achieve high-speed switching, the computational requirements of the scheduler must be very small.

A related scheduling problem has been recognized in the prior art. In this related problem formulation, a "traffic matrix" represents the aggregate demand for input/output (I/O) pairs over a period of time slots. In a heavily overloaded situation in which the input queues to the switch have many requests in them, the traffic matrix could be viewed as a tabulation of the queue contents. This type of problem formulation is common in the area of satellite-switched time-division-multiple-access (SS/TDMA) systems as described, for example, by T. Inukai in "An Efficient SS/TDMA Time Slot Assignment Algorithm", *IEEE Trans. on Communications*, vol. 27, no. 10, pp. 1449-1455, 1979. A class of optimal algorithms have been developed to satisfy a given traffic matrix within C time slots where C is the maximum aggregate demand, from the traffic matrix, on any input or output. See also C. Rose, "Rapid Optimal Scheduling for Time-Multiplex Switches using a Cellular Automaton", *IEEE Trans. on Communications*, vol. 37, no. 5, pp. 500-509, May 1989. Unfortunately, these algorithms are computationally expensive and thus do not lend themselves to high-speed switch applications, particularly for large N. In fact, to apply optimal scheduling to situations in which N is large, Rose proposed an approach that uses $N^2$ processors that run algorithms whose computation times vary as O(N). Thus, in high-speed packet switches with a large number of ports, the computation of the optimal schedule can require a prohibitive amount of hardware.

SUMMARY OF THE INVENTION

It is therefore an object of the present invention to provide a scheduling mechanism that provides fair access in a time slotted switch with multiple input queues.

It is another object of the invention to provide a two-dimensional generalization of the round-robin scheduling mechanism.

It is a further object of the invention to provide a computationally simple scheduler that provides guaranteed service to the queue within N time slots for an N×N switch.

It is yet another object of the invention to provide a fairer and yet still computationally simple scheduler that provides guaranteed service within 2N−1 time slots.

According to the invention, there is provided a scheduler which uses a "pattern sequence matrix" that indicates how a set of labelled generalized diagonal service patterns should be applied during a sequence of time slots. By "generalized diagonal", what is meant is any set of 2 to N elements in an N×N matrix that has no more than one element in any row or column. Thus, a "generalized diagonal service pattern" is a set of requests that can be served in parallel during a time slot since they require non-conflicting resources. The pattern sequence matrix is represented as a set of column vectors, each of which lists the order in which the service patterns should be applied during a given time slot. The scheduler uses a fixed sequence, across K time slots, of fixed patterns to achieve high-speed scheduling. By specifying additional properties of the diagonal patterns and the pattern sequence matrix, certain fairness guarantees can be provided. The K columns are cycled through during successive time slots until all of the columns in the pattern sequence matrix have been used after which the first column is again applied so that the same set of pattern sequence columns is repeated every K time slots.

The scheduler according to the invention first defines the specific "generalized diagonal service patterns" and "pattern sequence matrix" that will be used. Next, at time slot 0, the scheduler applies the sequence of generalized diagonal service patterns that are listed in column 0 of the pattern sequence matrix. As each pattern is applied within time slot 0, an element of the allocation matrix is set to "1" if the following conditions are satisfied at a specific element of the request matrix: 1) there is a request, 2) the currently applied diagonal service pattern includes the element, and 3) neither the input nor the output corresponding to this element have been previously allocated by the application of an earlier diagonal service pattern within the time slot. The process is continued until all of the diagonals listed in the column have been applied or until all of the input ports and output ports have been allocated, whichever comes first. The procedure is repeated for successive time slots until all of the columns in the pattern sequence matrix have been used and then repeated starting with column 0 of the pattern sequence matrix.

BRIEF DESCRIPTION OF THE DRAWINGS

The foregoing and other objects, aspects and advantages will be better understood from the following detailed description of a preferred embodiment of the invention with reference to the drawings, in which:

FIGS. 3A and 3B are respectively a diagonal pattern matrix, which describes the generalized diagonal service patterns, and a pattern sequence matrix;

FIGS. 3C and 3D are respectively sets of matrix patterns that are used in an example allocation for time slots 0 and 1;

FIG. 4 is a set of matrix patterns for time slots 0 to 15 for the Enhanced 2DRR algorithm;

DETAILED DESCRIPTION OF A PREFERRED EMBODIMENT OF THE INVENTION

Figures 1, 2:
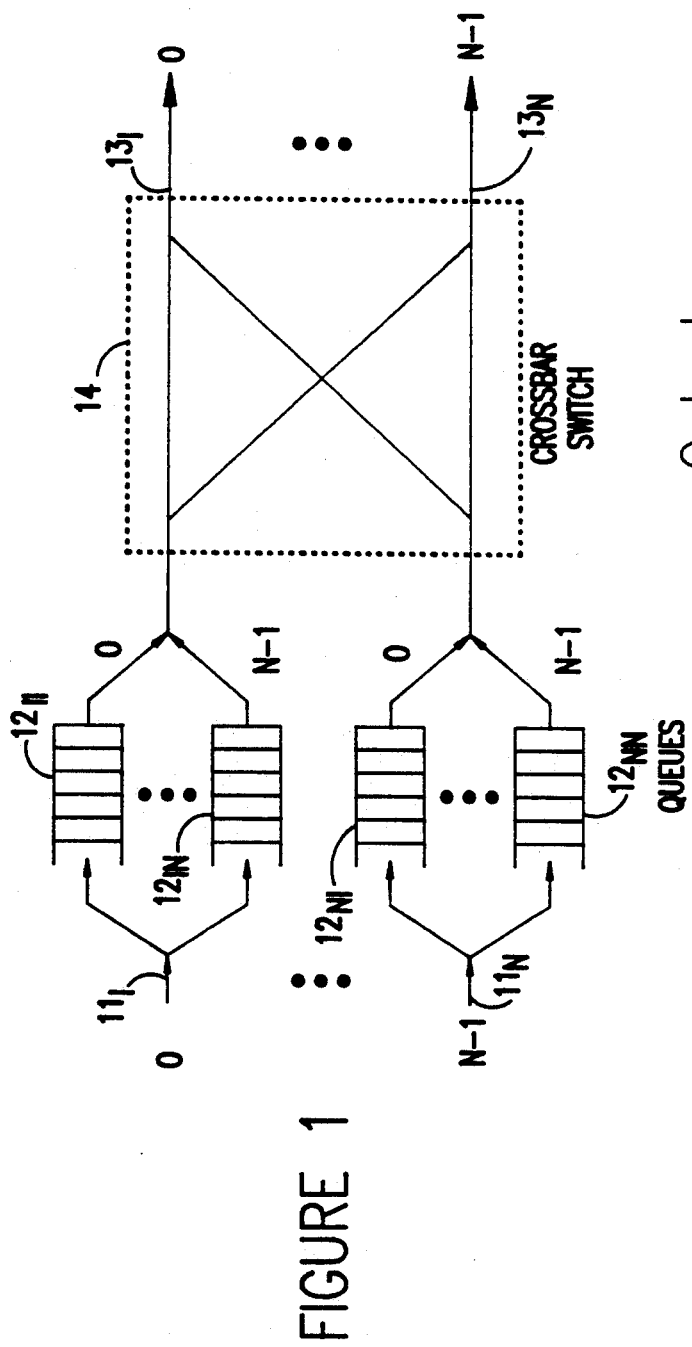
FIG. 1 is a schematic diagram illustrating the basic architecture of the switching structure.
FIG. 2 is a request matrix diagram of input and output ports for the switching structure shown in FIG. 1.

Referring now to the drawings, and more particularly to FIG. 1, there is shown the architecture of a switching structure in which the scheduler according to the invention is used. Each of the N input ports $11_1$ to $11_N$ has a set of N queues $12_{11}$ to $12_{1N}$ through $12_{N1}$ to $12_{NN}$ (one set of N queues for each input port). The input ports are connected to N output ports $13_1$ to $13_N$ through a switch 14. The switch 14 is an N×N crossbar switch and time is slotted. The fact that there is or is not traffic in a specific queue can be represented by a "1" or a "0", respectively, in the request matrix shown in FIG. 2. For example, the "1" in the (0,0) element of the request matrix denotes the fact that in the set of queues at the input port with index 0, the queue corresponding to output port 0 has one or more packets that are waiting to be transmitted.

The scheduler according to the invention uses a two-dimensional version of the round-robin scheme that is used in allocation problems with a single shared resource, as described, for example, by L. Kleinrock, *Queueing Systems, Vol. II: Computer Applications*, Chap. 4.4, Wiley, New York (1976).

The invention uses a diagonal pattern matrix, shown in FIG. 3A, and a pattern sequence matrix, shown in FIG. 3B, to implement the two-dimensional round-robin scheduling scheme. In an N×N switch, up to an N-fold parallelism can be achieved for certain request matrices when a "generalized diagonal" is used as the allocation pattern. That is, by sweeping a diagonal allocation pattern of length N through the request matrix, all $N^2$ input/output pairs in the request matrix can be satisfied in N time slots. As an illustration, consider the four diagonal patterns (indexed 0 through 3) that are shown in the diagonal pattern matrix of FIG. 3A. For example, diagonal pattern 0 is the main diagonal that is composed of pairs (0,0), (1,1), (2,2) and (3,3), and diagonal pattern 1 is composed of the pairs (0,1), (1,2), (2,3) and (3,0). By sequencing through these patterns during N=4 time slots, all of the pairs in the request matrix can be covered. Thus, by applying patterns 0, 1, ..., N−1 over a sequence of N time slots, it can be guaranteed that every requesting queue will receive at least one time slot of service over the N time slots.

After providing this basic fairness guarantee, there is a second problem of how to "fairly" serve those requests that are not in the current diagonal, but for which resources (i.e., input or output ports) are still available after the basic fairness guarantee has been provided. To solve this problem, we apply more than one diagonal in every time slot. Since fairness is affected by the order in which diagonals are applied within a time slot, we seek a pattern sequence in which no pattern index is consistently favored over the other indices. With this goal in mind, we consider the "pattern sequence matrix" of FIG. 3B. The columns of the "pattern sequence matrix" show the order in which the N patterns should be applied to the request matrix during a given time slot. As shown in FIG. 3B, a different ordering is applied at different time slots. After the N different columns have been used at N successive time slots, they are repeated again. Note that a different one of the N patterns is applied "first" during each time slot to provide the aforementioned fairness guarantee. Thus, if the diagonal patterns are applied according to the "pattern sequence matrix" of FIG. 3B, then over a period of N=4 time slots no pattern receives preference.

Figures 3C, 3D:
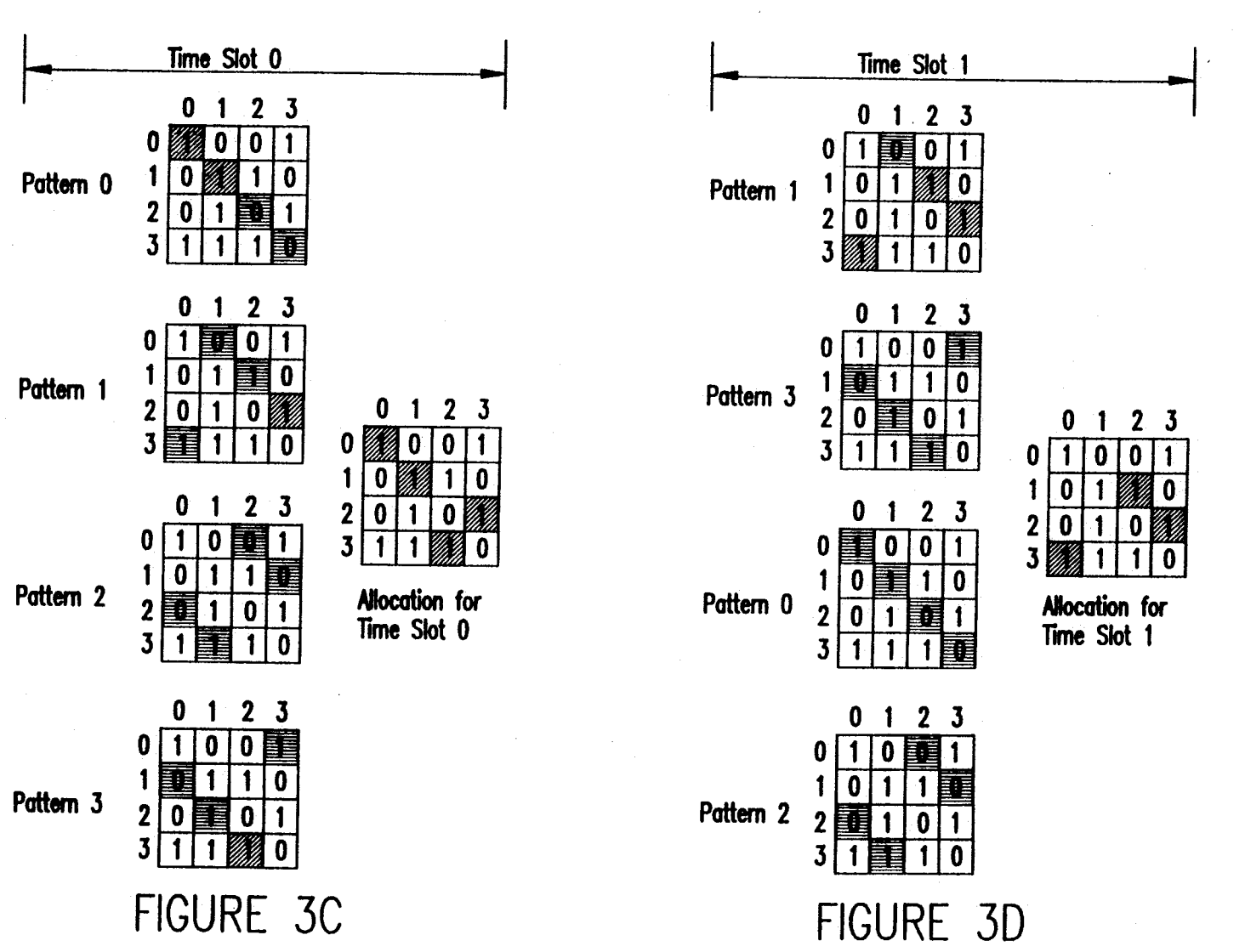

To further illustrate the two-dimensional round-robin (2DRR) scheduler we show, in the FIGS. 3C and 3D the operation of the scheduler for the request matrix of FIG. 2 and the diagonal pattern matrix and pattern sequence matrix of FIGS. 3A and 3B, respectively. As FIG. 3C shows, in time slot 0 pattern 0 of the diagonal pattern matrix is applied resulting in the granting of request pairs (0,0) and (1,1) and hence the allocation of input ports 0 and 1 and output ports 0 and 1. Since some input ports and output ports are still unallocated, we apply the next pattern, pattern 1, from column 0 of the pattern sequence matrix. In this case, the request pair (2,3) is granted. Note that request pairs (1,2) and (3,0) could not be granted at this step because input port 1 and output 0, respectively, had already been allocated. After patterns 2 and 3 have been applied in time slot 0, the resulting allocation of four request pairs for this time slot is shown. A similar procedure is used for time slot 1; however, in this case the pattern sequence of column 1 is now used. The application of this procedure is shown in FIG. 3D.

We shall refer to the two-dimensional round-robin (2DRR) scheduler that we have described above as the "Basic 2DRR scheduler" so as to distinguish it from a later version. The main steps of the Basic 2DRR scheduler are as follows:

1. Define the specific diagonal pattern matrix and the "pattern sequence matrix" that will be used.

2. In time slot 0, apply the sequence of diagonal patterns that are listed in column 0 of the pattern sequence matrix. As each pattern is applied within time slot 0 set an input/output pair of the allocation matrix to 1 if the following conditions are satisfied for a specific pair in the request matrix: 1) there is a request, 2) the currently applied diagonal pattern includes the pair, and 3) neither the input nor the output corresponding to this pair have been previously allocated by the application of an earlier diagonal pattern within the time slot. Continue the above process until all of the diagonals listed in the column have been applied or until all of the inputs and outputs have been allocated, whichever comes first.

3. Continue the above procedure for successive time slots until all of the columns in the pattern sequence matrix have been used and then repeat the procedure starting with column 0 of the pattern sequence matrix.

The fairness properties of the 2DRR scheduler depend on the properties of the diagonal pattern matrix and the pattern sequence matrix. As was shown in FIG. 3A, the specific diagonal pattern matrix that is used in the Basic 2DRR scheduler is generated by the horizontal shifting of the main diagonal pattern 0. This results in the property that the N diagonal patterns, which are composed of N elements each, completely cover the $N^2$ elements of the N×N request matrix. As is later shown, there are other sets of diagonal patterns that also have this desirable property.

The pattern sequence matrix of FIG. 3B has some important properties. First, we see that no pattern index follows any other index more than once. For example, the column sequence 0-1 only appears once in the matrix. Further, in any row of the pattern sequence matrix of FIG. 3B, each index appears only once; that is, there are no repeated indices. We refer to these two properties as 1) no repeated direct orderings and 2) no repeated indices per row. In general, it can be shown that if N+1 is a prime number, then a pattern sequence matrix with both of the above properties exists. However, when N+1 is not prime, the aforementioned properties 1) and 2) cannot be achieved simultaneously. To address both the prime and non-prime cases, we have developed a general sequencing scheme that yields a fair pattern sequence matrix when N+1 is prime and yields a "nearly fair" pattern sequence matrix when N+1 is not prime. To illustrate this scheme, consider again the pattern sequence matrix of FIG. 3B. This matrix was generated by incrementing the pattern index by (i+1) mod (N+1) within slot time i. This technique produces a fair pattern sequence matrix whenever N+1 is a prime number. When N+1 is not prime, we use the smallest prime number that is greater than N+1 and ignore any index that is greater than N−1. We list in pseudocode form the procedure for generating this pattern sequence matrix, PM[0 ... N−1,0 ... N−1], where the modulus M is the smallest prime number that is greater than or equal to N+1.

```
do from J=0 until J=N−1 { /*sequence through N
    columns*/
    OFFSET=J+1
    P=−1 /*setup to make J first pattern in
        sequence*/
    do from I=0 until I=N−1 { /*sequence through N
        rows*/
        do { /*compute next pattern number in
            sequence*/
            P=modulus(P+OFFSET,M)
        } until (P<N) /*ignore the values N, ... , M−2*/
        PM[I,J]=P /*store the pattern sequence*/
    } end_do
} end_do
```

In the above procedure, the "modulus" operator can be implemented in the following simple form since we know that R<2S−1.

$$\text{modulus}(R,S) = \begin{cases} R, & \text{if } R<S \\ (R-S), & \text{otherwise} \end{cases}$$

Further, note that the maximum number of times that the body of the innermost do-loop executes is given by the integer part of (M−N)/2 plus 1 (i.e., $\lfloor (M-N)/2 \rfloor +1$). Thus, when N+1 is prime, the do-loop body is only executed once and can be replaced by a single statement in these cases.

Enhanced 2-dimensional Round-Robin Scheduler

The Basic 2DRR scheduler uses a total of N diagonal patterns in an attempt to provide fair scheduling. There are actually N! (N factorial) different diagonal patterns that can be considered for a N×N request matrix. The fairness properties of the 2DRR scheduler can be improved by using a larger number of diagonal patterns than N. In this section, we describe an "Enhanced 2DRR" scheduler that uses a total of $N^2$ different diagonal patterns.

The "Enhanced 2DRR" scheduler uses N different diagonal pattern matrices (each of which is comprised of N diagonal patterns) but still uses the same pattern sequence matrix that is used in the Basic 2DRR scheduler as was shown in FIG. 3B. The patterns in the diagonal pattern matrix of the Basic 2DRR scheduler are generated by shifting the main diagonal. Thus, the diagonal pattern that is composed of the elements (0,0), (1,1), (2,2) and (3,3) is the generator of the diagonal pattern matrix to the Basic 2DRR scheduler. In the Enhanced 2DRR scheduler, N different "generators" are used to generate the N different diagonal pattern matrices. These "generating" diagonal patterns are derived from the pattern sequence matrix. To illustrate the operation of the Enhanced 2DRR scheduler, we show in FIG. 4 the N=4 diagonal pattern matrices that are used during N phases of N time slots. The generators of these diagonal pattern matrices are the elements that are marked with bold boundaries. Note how diagonal patterns 1, 2 and 3 are obtained by shifting the generating diagonal pattern to the right. The same pattern sequence matrix is used for each diagonal pattern matrix.

The "Enhanced 2DRR" scheduler can be viewed as the Basic 2DRR scheduler in N different phases where a different diagonal pattern matrix is used during each phase of N time slots. The main steps of the Enhanced 2DRR scheduler are as follows:

1. Define the N "diagonal pattern matrices", labelled matrix 0 through N−1 and the "pattern sequence matrix" that will be used
2. In the first scheduling phase, which lasts from time slot 0 to N−1, use diagonal pattern matrix 0 and the pattern sequence matrix as was described in the Basic 2DRR scheduler.
3. In the second phase, which lasts from time slot N to 2N−1, use diagonal pattern matrix 1 and the same pattern sequence matrix.
4. Continue the procedure of steps 2 and 3 for the remaining phases and diagonal pattern matrices until phase N−1 is completed at time slot $N^2-1$. At this time, the entire process that begins with step 2 is repeated.

Since different diagonal pattern matrices are used for consecutive sets of time slots, the Enhanced 2DRR scheduler has a looser fairness guarantee than the Basic 2DRR scheduler. Specifically, it can be shown that the Enhanced 2DRR scheduler guarantees that every requesting queue will receive at least one time slot of service during every period of 2N−1 time slots of time. (Recall that the guarantee for the Basic 2DRR scheduler was one service every N time slots.) Despite the looser fairness guarantee, it is important to note that over the longer time horizon of $N^2$ time slots, the Enhanced 2DRR scheduler guarantees that each request receives at least N services.

2DRR Algorithms Presentation

We briefly describe the Basic 2DRR and Enhanced 2DRR algorithms from an implementation viewpoint before proceeding to the actual architectures.

The Basic 2DRR Algorithm

The switch operates in cycles $T_j$, where subscript j means that $T_j$ is the j-th cycle of the switch's operation.

We assume that we are given the following $N \times N$ matrices:

1. Request Matrix: Each entry RM[r][c] is binary with the semantics:

$$RM[r][c] = \begin{cases} 1, & \text{if there is a request for a connection from input r to output c;} \\ 0, & \text{otherwise.} \end{cases}$$

2. Diagonal Matrix: Each entry DM[r][c] contains an integer between 0 and (N−1) (inclusive), and DM[r][c]=k implies that RM[r][c] is covered by the k-th diagonal. The diagonals are constructed as follows: RM[r][c] is covered by diagonal k=(c−r) mod N.

3. Pattern Sequence Matrix: Each entry PM[i][j] is an integer between 0 and (N−1) with the semantics: PM[i][j]=k implies that during switch cycle $T_m$ such that j=m mod N, the i-th diagonal in the sequence applied by the algorithm is the one numbered k.

As mentioned previously the switch operates in a synchronous fashion with a sequence of clock cycles: $T_0, \ldots, T_m, \ldots$. According to the algorithm, all N diagonals are applied during every switch cycle to determine which connections should be established next. To implement this, we divide each cycle $T_m$ into N "intervals": $T_m^0, \ldots, T_m^{(N-1)}$. The diagonal that is applied during interval $T_m^i$ is the one specified in entry PM[i][j], where J=m mod N. If PM[i][j]=k, then the requests examined in this interval are the ones in RM[r][c], such that DM[r][c]=k where $0 \leq r \leq (N-1)$, $0 \leq c \leq (N-1)$. The result of the 2DRR algorithm is an $N \times N$ matrix, the "Allocation Matrix", AM, with binary entries and the semantics:

$$AM[r][c] = \begin{cases} 1, & \text{if a connection is allocated from input r to output c;} \\ 0, & \text{otherwise.} \end{cases}$$

According to the algorithm, the entry AM[r][c] will be set during interval $T_m^i$, if and only if the following conditions are satisfied:
1. RM[r][c]=1;
2. input r and output c are available for allocation (i.e., they have not been allocated to a different connection by a previously applied diagonal of the same cycle $T_m$); and
3. DM[r][c]=k, where PM[i][j]=k, where j=m mod N. Given the above, our problem is to calculate the "Allocation Matrix", AM, in every cycle $T_m$.

The Enhanced 2DRR Algorithm

The Enhanced 2DRR algorithm operates in a way similar to that of the Basic 2DRR algorithm described above. The difference, which is the basis of the performance improvement that the Enhanced 2DRR algorithm provides, is that in the Enhanced 2DRR algorithm, the DM matrix is dynamic, i.e., it changes every N cycles. The Enhanced 2DRR algorithm operates in N "phases". Each phase is composed of N consecutive cycles. The set of diagonals is different for every phase.

Given the set of diagonals that are to be used within a phase, the algorithm applies them as is described above in the Basic 2DRR case. The diagonals change in every phase with a total period of N phases, i.e., the same set of diagonals is used after N phases. This implies that the matrix DM mentioned above is dynamic. We describe how the DM matrix changes:

$$DM[r][c] = (c - PM[r][p]) \bmod N,$$

where p is the phase number: $p = \lfloor (m \bmod N^2)/N \rfloor$ for cycle $T_m$ and where the phases are numbered from 0 to (N−1).

An important characteristic of the Enhanced 2DRR algorithm is the way in which diagonals are chosen. In every phase, they are constructed using the Pattern Sequence Matrix PM as a reference. This allows the algorithm to use already stored (and needed) information instead of requiring new data (or additional circuitry) describing how DM should change.

2DRR Centralized Scheduler

In this design, we take advantage of the inherent parallelism in the calculation of the "Allocation Matrix". That is, in interval i of cycle $T_m$, each cell can calculate its corresponding AM[r][c] given the following information:
1. availability of input r and output c;
2. value of RM[r][c]; and
3. PM[i][j], where j=m mod N.

In these parallel calculations, there is some information shared among cells of the scheduler;
1. input/output availability ($AV_i$[r]/$AV_o$[c]) information is shared among cells within the same row/column; and
2. the "Pattern Sequence" information, PM[i][j], is shared among all cells.

Figure 5:
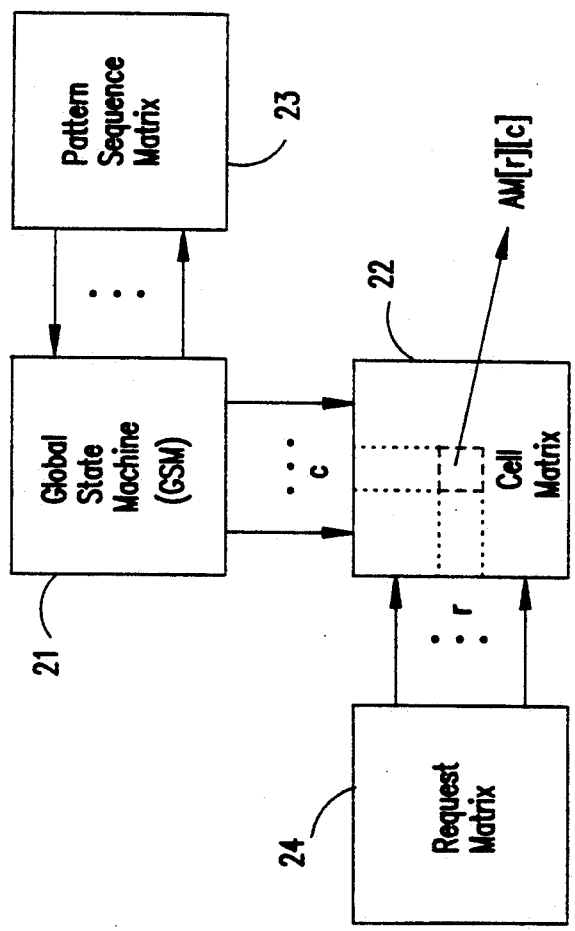
FIG. 5 is a block diagram showing the organization of the switching structure implementing the scheduler according to the invention.
Figure 5A:
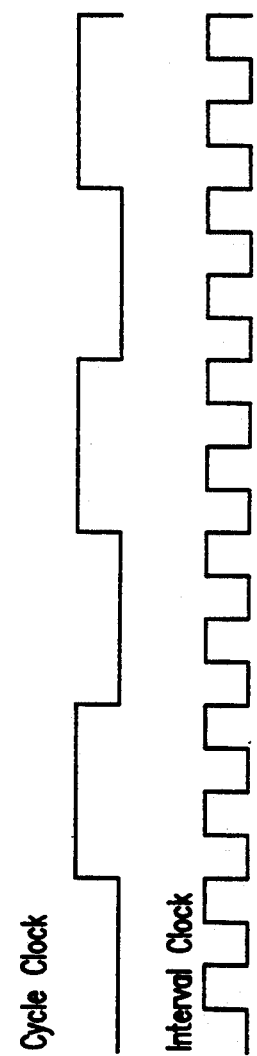
FIG. 5A is a timing diagram showing operation of the 4×4 switch shown in FIG. 5.

The organization of the partially parallelized scheduler is shown in FIG. 5. The two main parts of the design are the "Global State Machine" 21 and the "Cell Matrix" 22. The purpose of the "Global State Machine" 21 is to distribute the diagonal information from the pattern sequence matrix 23 during each interval, while the purpose of the "Cell Matrix" 22 is to calculate and store the bits of the "Allocation Matrix" based on inputs from the request matrix 24. FIG. 5A shows the clocks of the system assuming N=4.

During interval $T_m^i$, the "Global State Machine" 21 activates the cells that belong to diagonal D(j,i), j=m mod N, which is applied by the algorithm in this interval. The diagonal number is dictated by entry PM[i][j]. The problem is to identify the diagonal $D(j_1,i_1)$, $j_1=m_1$ mod N that is applied during the interval $T_{m_1}^{i_1}$ immediately following interval $T_m^i$. If the "Pattern Sequence Matrix" PM is stored, then the diagonal is obtained by accessing the entry $PM[j_1][i_1]=D(j_1,i_1)$. If PM is not readily accessible (stored), the "Global State Machine" 21 can calculate the diagonal $D(j_1,i_1)$ for the next interval $T_{m_1}^{i_1}$ on-line in the following fashion: if $i_1=0$ (i.e., i=(N−1)), then $j_1=(j+1) \bmod N$, and $D(j_1,i_1)=D((j+1) \bmod N, 0)=(j+1) \bmod N=j_1$; otherwise, $i_1=(i+1)$, $j_1=j$ and $D(j_1,i_1)$ is calculated with the following function:

$$D(j_1,i_1) = \begin{cases} (D(j,i)+(j+1)) \bmod M, & \text{if } D(j,i) < (N-(j+1)) \\ \left(D(j,i) + \left\lceil \dfrac{M-D(j,i)}{(j+1)} \right\rceil (j+1)\right) \bmod M, & \text{if } (N-(j+1)) \leq D(j,i) \end{cases}$$

where M is the smallest prime that is larger than N.

In this centralized model, the "Global State Machine" 21 produces signals that enable the cells. That is, the Sel[r][c] signal indicates that for this interval, the cell with input r and output c belongs to the current diagonal. Furthermore, we assume that the following binary signals are available to each cell of the matrix: (r is the corresponding input while c is the corresponding output):

$$AV_I[r] = \begin{cases} 1, & \text{if input r is not allocated to a connection yet;} \\ 0, & \text{if input r is already allocated.} \end{cases}$$

$$AV_O[c] = \begin{cases} 1, & \text{if input c is not allocated to a connection yet;} \\ 0, & \text{if input c is already allocated.} \end{cases}$$

Given the above information, each cell of the "Cell Matrix" can calculate its corresponding entry AM[r][c] with the following logic function:

$$AM[r][c] = Sel[r][c] \cdot RM[r][c] \cdot AV_I[r] \cdot AV_O[c],$$

where · is the logical AND function and the Sel[r][c] signal is propagated by the "Global State Machine" 21 to the "Cell Matrix" 22. The cell that sets AM[r][c] to 1 also resets the values $AV_I[r]$ and $AV_O[c]$ to indicate that input r and output c respectively have been allocated to a connection.

Figure 6:
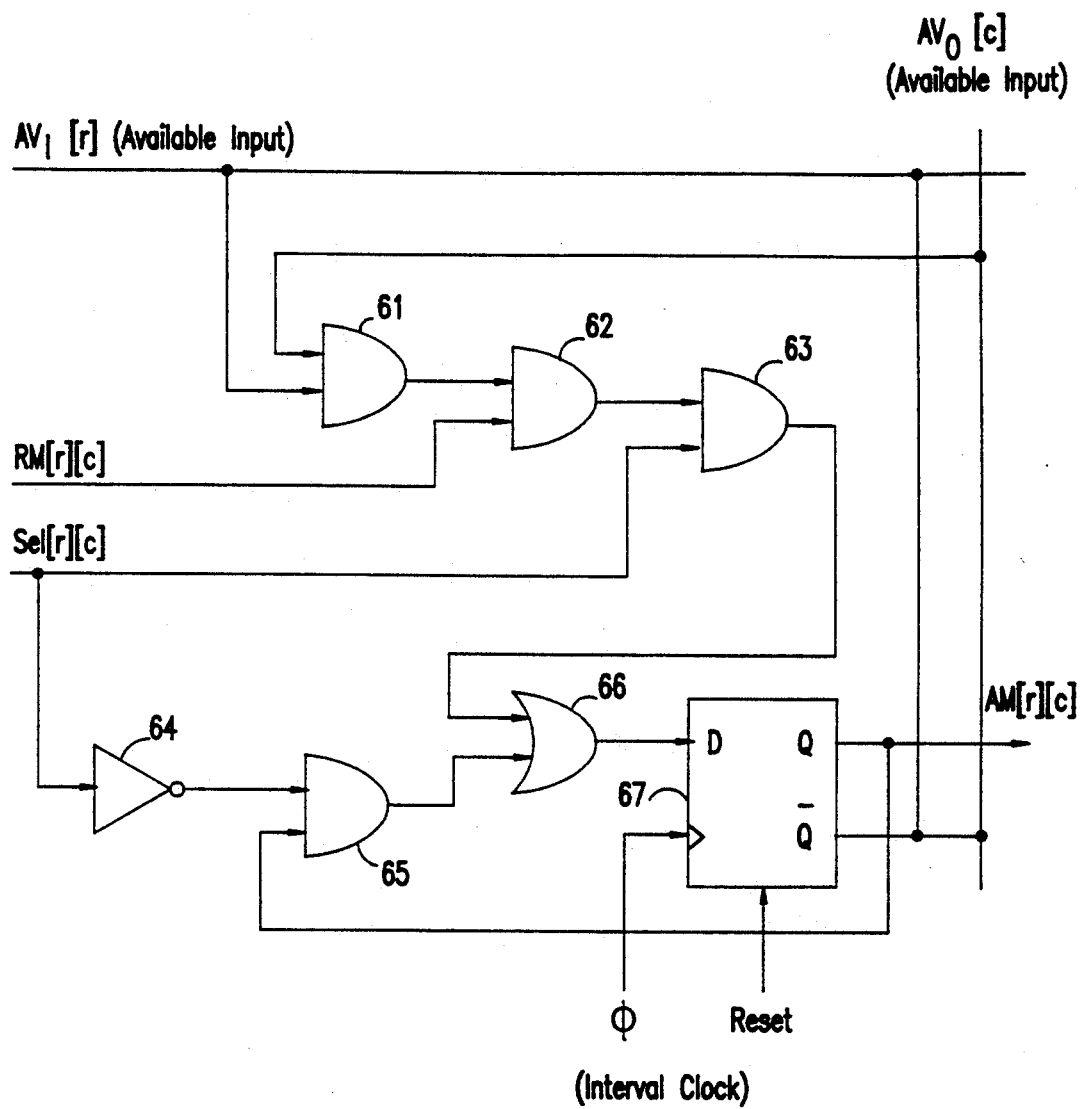
FIG. 6 is a logic diagram of the design of a cell in the "Cell Matrix"

FIG. 6 shows the design of a cell in the "Cell Matrix" 22. The cell implements the function described above and its signals are named in accordance to the formula given. The cell is reset at the beginning of each cycle using the Reset signal of flip-flop 67. So, output Q is reset to logical "0". As long as the cell is not selected by the controller, the signal Sel[r][c] is negated (i.e., set to logical "0") implying that the output of inverter 64 is asserted (i.e., set to logical "1"). When this output of inverter 64 is asserted, the value of the output of the AND gate 65 is equal to the output Q of flip-flop 67. Furthermore, the output of AND gate 63 is negated (i.e., set to logical "0") since its input Sel[r][c] is negated. This results in the output of OR gate 66 delivering the output of AND gate 65 (i.e., the value Q of flip-flop 67). So, while Sel[r][c] is negated, the flip-flop 67 retains its value during consecutive cycles of the Interval Clock φ, until it is reset at the beginning of the next cycle. When Sel[r][c] is asserted, the output of AND gate 63 is equal to the output of AND gate 62, which is $AV_I[r] \cdot AV_O[c] \cdot RM[r][c]$. That is, the output of AND gate 63 is asserted if there is a request RM[r][c], the corresponding input r is available for allocation ($AV_I[r]$ is asserted), and the corresponding output c is available for allocation ($AV_O[c]$ is asserted). So, the output of AND gate 63 is asserted when a connection should be established between input r and output c as explained above. Since Sel[r][c] is asserted, the output of inverter 64 is negated and thus the output of AND gate 65 is negated; so, the output of the OR gate 66 becomes equal to the value of AND gate 63. So, if all the appropriate signals are asserted as described above, the output of OR gate 66 is asserted, causing the output of flip-flop 67, AM[r][c], to be asserted after the appropriate edge of the interval clock φ appears. After the value has been calculated during selection of the cell, the cell will retain its value as explained above, until a new Reset signal arrives (i.e., the next cycle begins).

We have two choices for distributing the current diagonal number during each interval;
1. calculate the diagonal number that is applied during each interval; or
2. calculate PM during initialization, store it in memory, and access it during normal operation.

The diagonal information is subsequently distributed to all of the cells.

Enhanced 2DRR Distributed Scheduler

For the Enhanced 2DRR scheduler, we follow a similar approach to that described above, i.e., we parallelize the calculation of the AM entries. The information needed at every cell is the same as was needed for the Basic 2DRR scheduler and the calculation of the AM cells is the same. The fundamental difference for the Enhanced 2DRR scheduler is that the cells belong to different diagonals in different phases. So although in the Enhanced 2DRR scheduler architecture we use a cell that is similar to that of the Basic 2DRR scheduler for the calculation of AM[r][c], there is a difference in the selection process of a cell, i.e., the calculation of Sel[r][c].

For the Basic 2DRR scheduler, a cell with coördinates r and c is selected by the "Global State Machine" 21 when the diagonal number selected for application in an interval matches the entry DM[r][c] in the Diagonal Matrix. For the Basic 2DRR scheduler, the diagonal DM[r][c] is static (constant over time). More precisely, DM[r][c] = (c−r) mod N.

We implement the Enhanced 2DRR scheduler by having every cell with coördinates r and c test in every interval whether the following equality holds:

$$D(j,i) = (c - PM[r][p]) \bmod N,$$

where D(j,i) is the diagonal number that is broadcasted during interval $T_m^i$, j=m mod N and p is the phase number. With this approach, each cell needs to read matrix PM every N cycles to obtain the entry PM[r][p]. Since this information is different for every cell, the memory storing PM is a "hot spot" and thus the involved delays are high.

Figure 7:
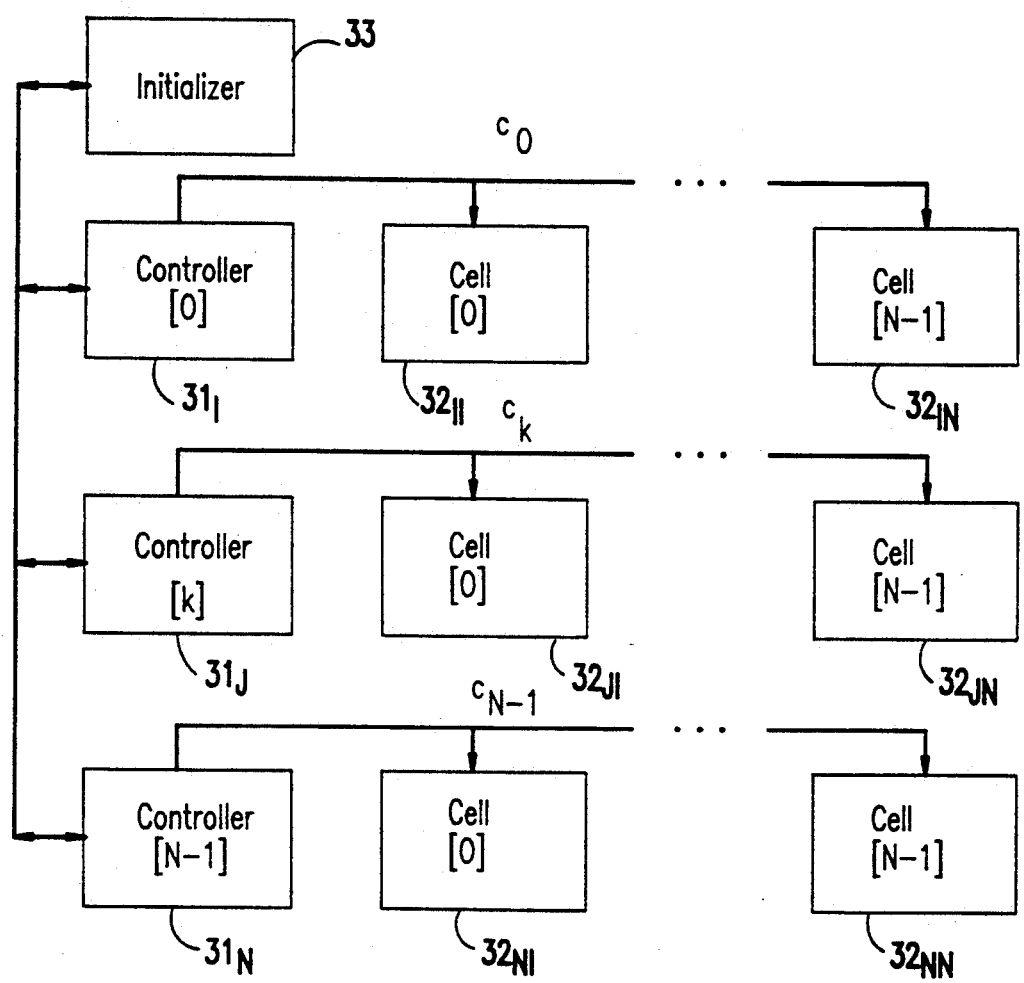
FIG. 7 is a block diagram illustrating the distribution of control in the Enhanced two dimensional round-robin scheduler.

To avoid this problem, we distribute the control on a per row basis as shown in FIG. 7. As shown in FIG. 7, there is a controller in every row, the "Row Controller" $31_1$ to $31_N$, which in every interval broadcasts the index c of the selected cell to all of the cells in its row. In turn, every cell, $32_{11}$ to $32_{1N}$, . . . , through $32_{N1}$ to $32_{NN}$, checks whether the broadcast c matches its own column index in a parallel fashion. The one that matches is selected to calculate its AM entry as described for the Basic 2DRR scheduler (with the same circuitry as was described above). Each controller calculates the number c to broadcast in the following fashion:

$$c = (PM[i][j] + PM[r][p]) \bmod N,$$

where r is the row number, $T_m^i$ is the current interval, p is the phase number, and j=m mod N.

The architecture shown in FIG. 7 operates as follows. During initialization, the "Initializer" 33 calculates matrix PM and stores it in the "Row Controllers" $31_1$ to $31_N$ on a row basis, i.e., Row Controller[r] stores Row[r] of PM. Since Row Controller[r] has Row[r] of PM locally stored, it can obtain PM[r][p] by directly accessing its local memory. PM[i][j] is the datum needed by all of the Row Controllers and is stored in the local memory of Row Controller[i]. For this reason, the operation of the controllers is divided into two phases: "broadcast" and "calculation". During the broadcast phase, only the Row Controller[i] operates and broadcasts to all of the remaining controllers the entry PM[i][j] that is stored in its local memory. This is performed over the "Broadcasting Bus" 34, as is shown in more detail in FIG. 8.

Figure 8:
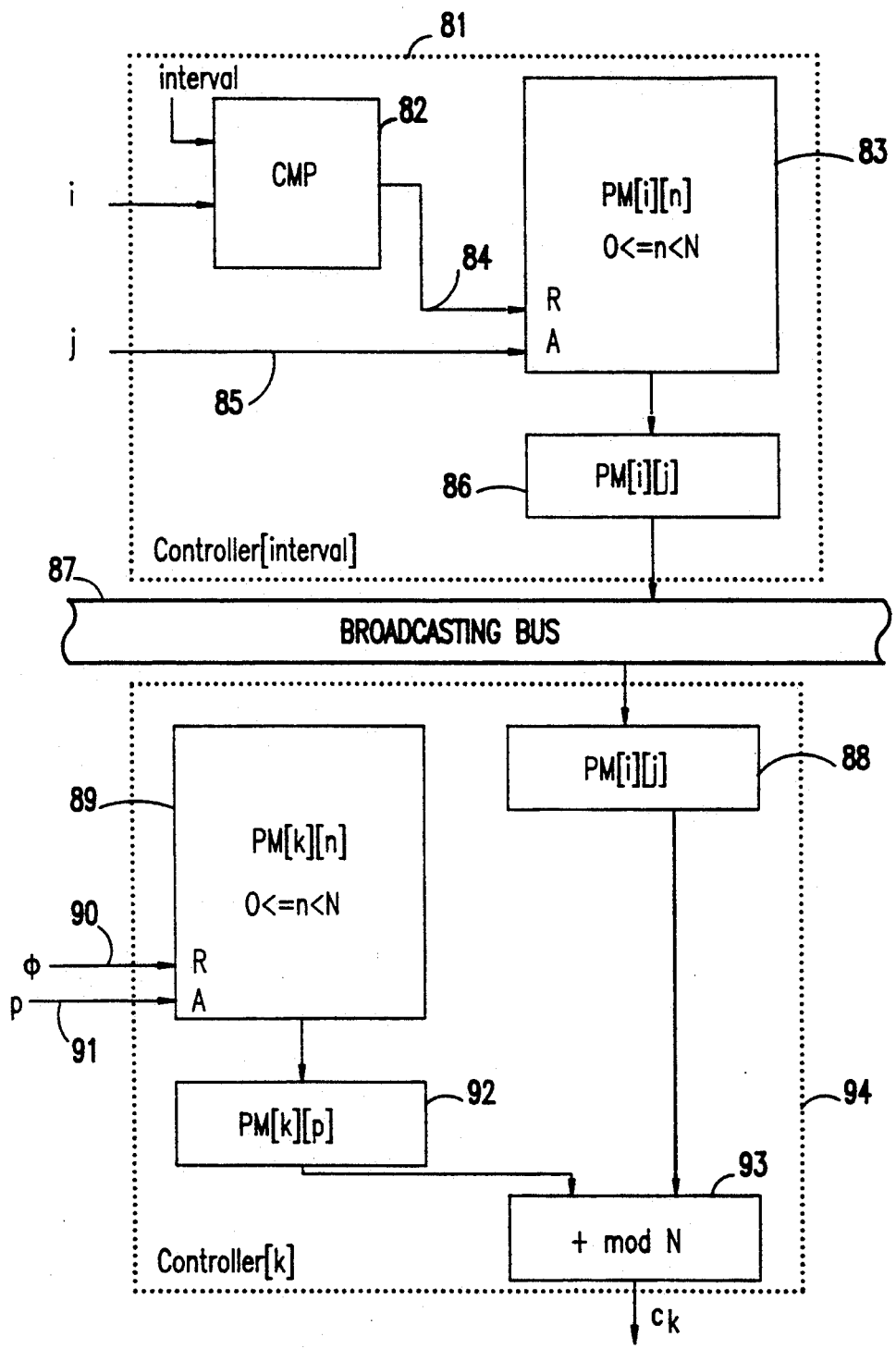
FIG. 8 is a more detailed block diagram showing the row controllers of FIG. 7 connected to the broadcast bus.

FIG. 8 shows two controllers, Controller[interval] 81 and Controller[k] 94. Assume that the clock interval with index interval within the cycle $T_m$ appears. Then line i, 95, will have the value interval and so the result 84 of comparator CMP, 82, will be asserted, asserting the Read(R) signal of the memory 83 which stores the entries of the PM matrix, PM[i][n], $0 \leq n < N$. When line 84 is asserted, it causes the memory to be read using the lines 85 with Address(A) value j (j=m mod M). This results in the transfer of the value PM[interval][j] into the register circuit 86. All of the above occur during the beginning of the "broadcast" phase. When the entry PM[interval][j] moves into register circuit 86, its data are broadcast over the bus 87 to all other controllers, e.g., Controller[k], 94. Controller[k] 94 then stores this data in its register circuit 88.

After the "broadcast" phase is completed, the "calculate" phase starts where the memory 89 is read using p, the phase number as the Address(A), 91, and the appropriate interval clock $\phi_1$ for the Read(R) line 90 of the memory. So, the entry PM[k][p] is output from memory 89 and input to the register circuit 92. Then, the contents of the two registers 88 and 92 are added modulo N with the modulo N adder 93 producing the index $c_k$ that is broadcast by the Controller[k] 94 to the corresponding cells, as described above; i.e., $c_k$=(PM[interval][j]+PM[k][p]) mod N.

With reference to FIG. 7, Controller[k] 94 of FIG. 8 is Controller $31_j$ in FIG. 7, and thus the above result is broadcast to the cells $32_{j1} \ldots 32_{jN}$. These cells are similar to the cell of FIG. 6 with the addition of some circuitry. This additional circuitry asserts Sel[r][c], when c is equal to $c_k$, where $c_k$ is broadcast by Controller[k] and c is the column index of the corresponding cell.

During the calculation phase, each controller accesses its own local memory to obtain the entry PM[r][p]. Then it adds it to the latched entry PM[i][j] that was broadcasted during the preceding broadcast phase. In this fashion, each Row Controller calculates the index c which is active during this interval, as shown in FIG. 8, and broadcasts it to all of the cells in its row. The cell whose column index matches c is activated and calculates the corresponding AM entry in exactly the same way as was described for the Basic 2DRR scheduler.

While the invention has been described in terms of basic and enhanced preferred embodiments of the 2DRR scheduler, those skilled in the art will recognize that the invention can be practiced with modification within the spirit and scope of the appended claims.

Having thus described our invention, what we claim as new and desire to secure by Letters Patent is as follows:

1. In a switching system, a method of scheduling requests from N input ports to N output ports where no two input ports can have a request serviced for the same output port at the same time, where N is a positive integer, and no two output ports can have requests serviced for the same input port at the same time, and further each input port is comprised of N queues, one per each output port, that store requests, said method comprising the steps of:
    (a) establishing a request matrix with each entry indicating whether there is a request for service between a corresponding pair of one of said input ports and one of said output ports;
    (b) establishing a set of D diagonal service patterns on said matrix with no two elements of the same diagonal request pattern being in the same row and column of said matrix, where D is a positive integer;
    (c) establishing a pattern sequence matrix PM that specifies a sequence of said D diagonal service patterns for each of K consecutive time slots, where K is a positive integer;
    (d) sequencing said D diagonal service patterns for each time slot of said K time slots, where D is greater than 1, in accordance with the sequence in said pattern sequence matrix PM;
    (e) servicing requests in each time slot in accordance with a sequenced set of diagonal service patterns by overlaying each diagonal service pattern on the request matrix and servicing an underlying request indicated on the request matrix if it does not conflict with a request indicated on said request matrix and overlain by a previous diagonal service request pattern in said sequenced set of diagonal service patterns for said each time slot, with a sequenced set for each time slot being defined in step (d); and
    (f) repeating the previous step (e) for any subsequent set of K time slots using the same sequence of diagonal service patterns defined in step (d).

2. The method of scheduling requests recited in claim 1 wherein D=N and K=N and each queue is guaranteed to receive at least one time slot of service during every period of N time slots.

3. The method of scheduling recited in claim 2 further comprising the step of storing said pattern sequence matrix PM after step (c) and wherein step (d) is performed by a state machine accessing the stored pattern sequence matrix PM.

4. The method of scheduling requests recited in claim 1 wherein D=N×N and K=N×N and each queue is guaranteed to receive at least one time slot of service during every period of 2N−1 time slots.

5. The method of scheduling recited in claim 4 wherein said N input ports are connected to N output ports using an N×N switching matrix composed of cells arranged in rows and columns, further comprising the step of storing said pattern sequence matrix PM after step (c) in a plurality of row controllers on a row basis, there being one row controller for each row of said N×N switching matrix, said controllers performing step (d) in two phases, a broadcast phase and a calculation phase, wherein during the broadcast phase one of said row controllers broadcasts to all other row controllers an entry of said pattern sequence matrix PM stored locally and during the calculation phase each row controller calculates an index which is active during a time interval, said index being broadcast to all cells of a row and identifying the column in which a cell in that row activated for the time interval.

6. The method of scheduling requests recited in claim 1 wherein step (c), establishing a pattern sequence matrix PM, is performed according to the following pseudocode procedure for generating the pattern sequence matrix, PM[0 ... N−1, 0 ... N−1], where a modulus M is the smallest prime number that is greater than or equal to N+1, where M is a positive integer greater than or equal to 2:

```
do from J=0 until J=N−1 { /*sequence through N
    columns, where J is an integer greater than
    or equal to zero*/
    OFFSET=J+1
    P=−1 /*setup to make J first pattern in
    sequence, where P is an integer that is
    greater than or equal to −1 and less than or
    equal to M−1*/
    do from I=0 until I=N−1 { /*sequence through N
        rows, where I is an integer greater than or
        equal to zero*/
        do { /*compute next pattern number in
            sequence*/
            P=modulus(P+OFFSET,M)
        } until (P<N) /*ignore the values N, ..., M−2*/
        PM[I,J]=P /*store the pattern sequence*/
    } end_do
} end_do.
```

7. The method of scheduling recited in claim 6 further comprising the step of storing said pattern sequence matrix PM after step (c) and wherein step (d) is performed by a state machine accessing the stored pattern sequence matrix PM.

8. The method of scheduling recited in claim 6 wherein said N input ports are connected to N output ports using an N×N switching matrix composed of cells arranged in rows and columns, further comprising the step of storing said pattern sequence matrix PM after step (c) in a plurality of row controllers on a row basis, there being one row controller for each row of said N×N switching matrix, said controllers performing step (d) in two phases, a broadcast phase and a calculation phase, wherein during the broadcast phase one of said row controllers broadcasts to all other row controllers an entry of said pattern sequence matrix PM stored locally and during the calculation phase each row controller calculates an index which is active during a time interval, said index being broadcast to all cells of a row and identifying the column in which a cell in that row is activated for the time interval.

9. A switching system operative to schedule requests from N input ports to N output ports where no two input ports can have a request serviced for the same output port at the same time, where N is a positive integer, and no two output ports can have requests serviced for the same input port at the same time, and further each input port is comprised of N queues, one per each output port, that store requests, said switching system comprising:
 (a) a controller storing a request matrix having a plurality of entries, each entry indicating whether there is a request for service between a corresponding pair of one of said input ports and one of said output ports;
 (b) said controller further storing a pattern sequence matrix PM having a plurality of entries specifying a sequence of said D diagonal service patterns for each of K consecutive time slots, where D and K are positive integers, said pattern sequence matrix defining a set of D diagonal service patterns on said request matrix with no two elements of the same diagonal request pattern being in the same row and column of said matrix;
 (c) means, in said controller, for sequencing said D diagonal service patterns for each time slot of said K time slots, where D is greater than 1, in accordance with the sequence in said pattern sequence matrix PM; and
 (d) means, responsive to said means for sequencing, for servicing requests in each time slot in accordance with a sequenced set of diagonal service patterns by overlaying each diagonal service pattern on the request matrix and servicing an underlying request indicated on the request matrix if it does not conflict with a request indicated on said request matrix and overlain by a previous diagonal service request pattern in said sequenced set of the diagonal service patterns for said each time slot, with a sequenced set for each time slot being defined by said means for sequencing, said means for servicing repeating the servicing of requests for any subsequent set of K time slots using the same sequence of diagonal service patterns defined in by said means for sequencing.

10. The switching system recited in claim 9 wherein D=N and K=N and each queue is guaranteed to receive at least one time slot of service during every period of N time slots.

11. The switching system recited in claim 9 wherein D=N×N and K=N×N and each queue is guaranteed to receive at least one time slot of service during every period of 2N−1 time slots.

* * * * *